Jan. 19, 1971 — W. A. GERRANS — 3,555,799
TREE SHAKING MECHANISM
Filed Sept. 29, 1967 — 2 Sheets-Sheet 1

INVENTOR.
WILLIAM A. GERRANS
BY
Paul B. Fihe
PATENT AGENT

United States Patent Office 3,555,799
Patented Jan. 19, 1971

3,555,799
TREE SHAKING MECHANISM
William A. Gerrans, Colusa, Calif., assignor to Farmhand, Inc., Hopkins, Minn., a corporation of Delaware
Filed Sept. 29, 1967, Ser. No. 671,745
Int. Cl. A01g *19/00*
U.S. Cl. 56—328                                                                4 Claims

ABSTRACT OF THE DISCLOSURE

A tree shaking mechanism including a tree-engaging clamp suspended for vibration adjacent the outer extremity of an articulated boom capable of up and down and lateral adjustment on a mobile support to enable the clamp to be brought into gripping engagement with any one of a selected number of limbs on the tree to be shaken.

---

The present invention relates generally to the harvesting of fruits and nuts and, more particularly, to a tree-shaking mechanism which can be readily brought into vibratory contact with the limbs or trunk of a tree to effect a vibration and subsequent dislodging of the fruit or nuts thereof.

BACKGROUND OF THE INVENTION

A number of fruit and nut harvesters have been proposed, such as that shown in U.S. Pat. No. 3,248,865, which in one way or another establish gripping engagement with the limb or trunk of a tree and a subsequent vibratory action to dislodge the fruit or nuts from the tree when the same have become ripe. Quite commonly, these structures include a mobile support so that the harvesting equipment can be brought conveniently and rapidly to a position adjacent a tree from which the fruit or nuts are to be dislodged.

However, continued use of various fruit and nut harvesters and, more particularly, the mechanism for shaking each individual tree has indicated quite clearly that certain practical difficulties are experienced during the harvesting operation. For example, it is readily apparent that each tree has its own peculiar limb configuration and individual variances in the approach to the gripping and vibration of each particular limb on each particular tree are requisite. It has been found, furthermore, that the harvesting of the fruit or nuts from a particular tree not infrequently involves multiple approaches of the harvesting equipment to that one tree. Finally, limitations on the configurations of the harvesting equipment itself frequently necessitate a practical compromise in the manner of establishing connection with a tree limb in that a slight angular approach is sometimes requisite and, as a result, severe bark damage to the tree is encountered during the harvesting operation.

In short, existent equipment, while theoretically very effective, has, from a practical standpoint, presented certain problems in that difficulties in the approach to various trees have been encountered and, as a corollary, somewhat insufficient vibratory contact has been established with the trees so as to result in ineffective harvesting and/or damage to the trees themselves.

SUMMARY OF THE INVENTION

In view of the foregoing difficulties in existing harvesting equipment, it is a general objective of the present invention to provide specifically a tree shaking mechanism which can be used by itself or in conjunction with fruit or nut catchers and other harvester equipment to provide a very flexible and adaptable structure which can be brought rapidly and effectively into vibratory harvesting contact with each individual tree regardless of its individual structural peculiarities.

More particularly, this objective is achieved, at least in general terms, by mounting a tree-engaging clamp and an associated vibratory or reciprocatory inertia shaker unit adjacent the outer extremity of an articulated boom whose inner extremity is, in turn, carried by a tractor or other mobile support. Preferably, the articulated boom includes an inner boom section that is mounted for pivotal up and down and lateral swinging motion from its mounting on the tractor or other mobile support whose motion on the ground provides for desired lateral movement of this boom section into appropriate position relative to a tree having fruits or nuts thereon which are to be harvested. The articulated boom includes a second section which preferably is joined to the outer end of the first boom section for pivotal motion both in an up and down direction and laterally. Thus, conjointly, appropriate manipulation of the boom sections enables the tree engaging clamp to be brought towards operative engagement with a tree from its underside, from either lateral side thereof, or from its top.

To render this variable clamp approach most effective, the clamp, itself, has a general C-shaped configuration with the opening of the C extending laterally relative to the direction of shaking motion and the entire clamp can, in turn, be rotated so that this lateral opening can approach the tree from its bottom, its sides, or its top. In practice, if the mobile support for the entire tree shaking mechanism embodying the present invention is brought to a position adjacent a tree from which the fruit or nuts are to be harvested, sufficient flexibility of the boom and supported clamp mechanism is provided to enable substantially all limbs of the tree to be engaged and vibrated without any further motion of the mobile support itself. Thus, an effective structure is provided in terms of the time requisite for harvesting the fruit or nuts from a given tree. In addition, because of the flexibility of the approach to each individual tree, the clamping engagement therewith can be established in any desired fashion so that most effective transmission of vibratory forces to the tree is achieved to expedite the harvesting operation and at the same time minimize any bark damage to the tree itself.

BRIEF DESCRIPTION OF THE DRAWINGS

The stated objectives and the manner in which they are achieved will be more readily understood by a perusal of the following detailed description of one embodiment of the invention, illustrated in the accompanying drawings wherein.

DESCRIPTION OF THE EXEMPLARY EMBODIMENT

Figures 1, 2, 3:
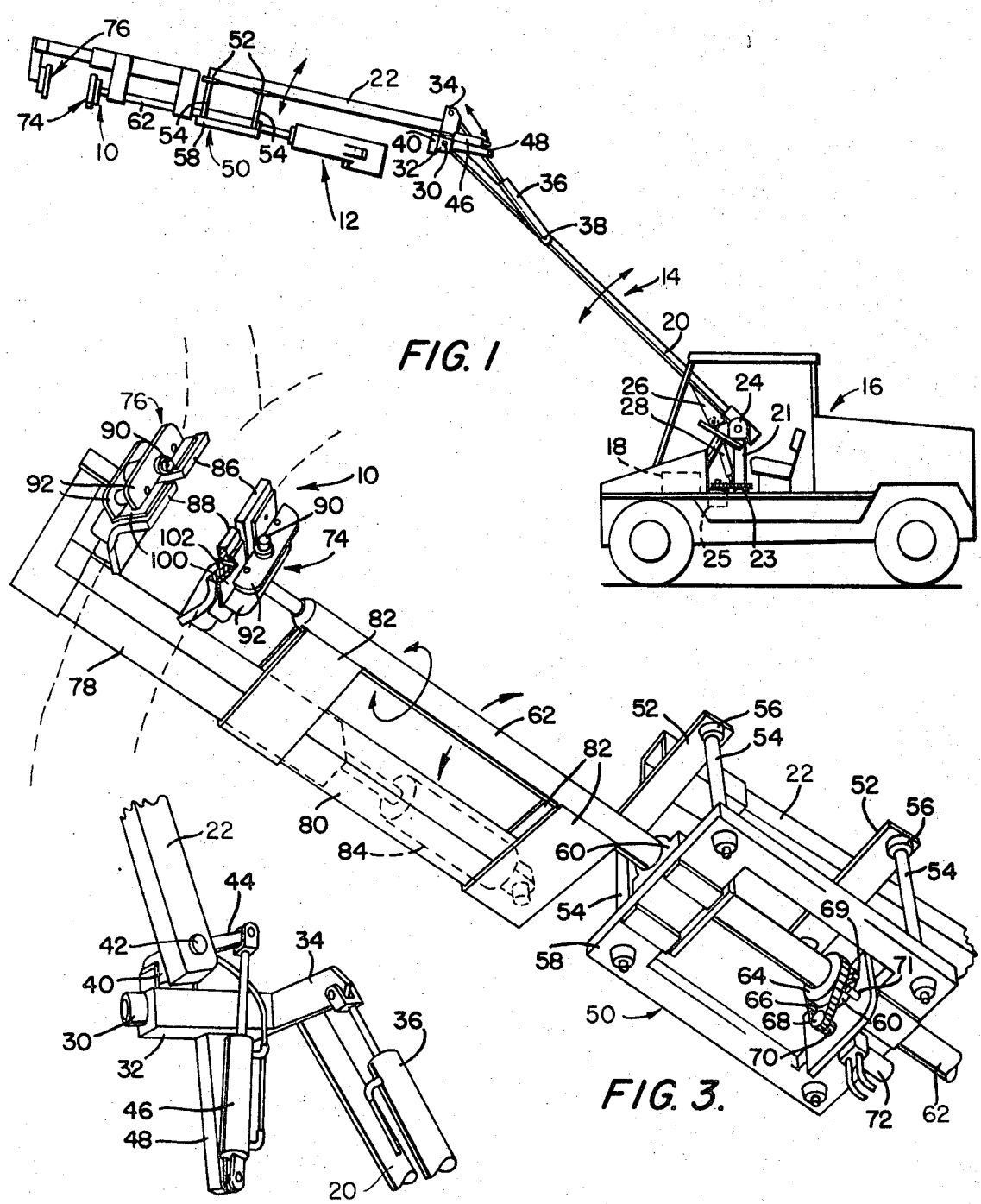
FIG. 1 is a side elevational view of a tree shaking mechanism embodying the present invention.
FIG. 2 is an enlarged fragmentary top perspective view of a portion of an articulated boom structure illustrated in FIG. 1 in its entirety.
FIG. 3 is an enlarged perspective view, as viewed from the underside of another portion of the FIG. 1 structure, showing a tree-engaging clamp and an associated shaker unit.

With initial referent to FIG. 1, the illustrated tree shaking mechanism embodying the invention includes a tree-engaging clamp, generally indicated at 10, arranged in operative association with an inertia shaker unit 12, the two being conjointly suspended for vibratory motion from the outer extremity of an articulated boom 14 whose inner extremity is, in turn, mounted from a mobile carrier 16 which can, as illustrated, take the form of a self-propelled automotive vehicle, such as a Jeep, or alternatively could take the form of a harvesting frame, such as shown in my aforementioned Pat. No. 3,248,865. The mobile carrier 16 preferably includes an internal combustion engine that not only provides for the self-propulsion of the Jeep or other vehicle but also is arranged to drive a hydraulic pump 18 or pumps for actuating the various hydraulic components of the system, as will be described hereinafter. Obviously, the Jeep or other mobile carrier 16 provides for horizontal translational motion of the entire tree shaking mechanism so that the same can be quickly and conveniently brought into operative disposition adjacent a tree from which fruits or nuts are to be dislodged.

With continued reference to FIG. 1, the articulated boom 14 includes two sections 20, 22, the inner section 20 having preferably the form of an elongated hollow steel tube whose lower or inner end is pivotally secured between the upstanding arms of a yoke 24 that is mounted on a pedestal 21, thus enabling pivotal motion of this boom section in an up and down or substantially vertical direction depending, of course, upon the precise disposition of the mobile carrier itself. A triangular plate 26 is welded to the under surface of the inner boom section adjacent its pivotal mounting and the lower projecting corner of this plate is pivotally joined to the end of a hydraulic ram 28 whose opposite extremity is mounted on the pedestal 21 for pivotal motion about a substantially horizontal axis so that upon an extension or retraction of the ram, the inner boom section 20 will be raised or lowered, as the case may be. The pedestal 21 is mounted on the mobile carrier 16 for rotation and a sprocket and chain connection 23 is made with a hydraulic motor 25 to enable selective rotation whereby the entire boom 14 is laterally swung about the pedestal axis.

As generally mentioned hereinbefore, the articulated boom 14 also includes a second outer boom section 22 which is interconnected with the first and above described boom section 20 for pivotal motion both in an up and down direction and also laterally. Thus, essentially, both vertical and horizontal articulation of the boom structure is enabled. More particularly, with continued reference to FIG. 1 and additional reference to FIG. 2, the inner boom section 20 carries adjacent its outer end a laterally projecting tubular stub 30 which mounts thereon a bracket 32 having interior bearings (not shown) permitting rotation thereof around the tubular stub. At its inner end adjacent the inner boom section, the bracket carries an upwardly projecting arm 34 to whose upper extremity one end of a hydraulic ram 36 is pivotally secured. The opposite extremity of the hydraulic ram 36 is, in turn, pivotally secured to a lateral pin 38 projecting from the inner boom section 20 at a spaced distance from its extremity. As can be best visualized by reference to FIG. 1, extension or retraction of the hydraulic ram 36 will effect rotation of the bracket around the tubular stub 30 in a counter-clockwise or clockwise direction respectively.

Adjacent its outermost end or in other words remote from the mounting inner boom section 20, the rotary bracket 32 carries a cylindrical socket 40 whose axis is preferably perpendicular to the axis of the projecting stub 30, as best illustrated in FIG. 2. This cylindrical socket 40, in turn, receives bearings on the exterior of a pin 42 arranged for rotation therewithin and secured at its upper end to the inner extremity of the outer boom section 22 so that the latter can pivot in a lateral plane.

In order to control such pivotal motion, a bracket 44 projects laterally from the mounted end of the outer boom section 22 and is pivotally joined at its outer extremity to one end of a hydraulic ram 46 whose opposite extremity is pivotally secured to an arm 48 forming a rearward extension of the described bracket 32. Accordingly, extension of this hydraulic ram 46 will effect counter-clockwise pivotal motion of the outer boom section, as viewed in FIG. 2, whereas retraction of the ram will effect swinging motion of the outer boom section 22 in a clockwise direction, as so viewed. In view of the essentially universal articulation of the outer boom section 22 relative to the inner boom section 20, it will be clear that such outer boom section and any mechanism suspended therefrom can be readily moved to various positions around a tree when the supporting mobile carrier has moved the entire mechanism into an adjacent relationship thereto.

Adjacent the outer end of the described second section 22 of the articulated boom 14, a suspension bracket 50 is carried for holding the mentioned clamp 10 and shaker unit 12 in a fashion which permits the vibratory reciprocation thereof. More particularly, adjacent its outer end, the outer boom section 22 rigidly mounts a pair of laterally extending shoulders 52, each of which is provided with openings at both ends for loose reception of suspension arms 54, as best shown in FIG. 3. At its upper end, each suspension arm 54 is resiliently secured within the shoulder opening by rubber connecting members 56 which permit a slight pivotal motion of the downwardly projecting end of the arm. At its lower end, each of the arms 54 is similarly connected by a resilient member 56 to openings in the four corners of a generally rectangular frame 58 which accordingly can shift relative to the suspending boom 14 but will be maintained at all times in substantial parallelism therewith, since in effect a parallelogram structure has been defined by the described shoulders 52, the suspending arms 54, and the suspended frame 58. The suspended frame 58 mounts a pair of aligned bearings 60 which receive therewithin a reciprocatory boom section 62 of generally cylindrical configuration which is capable of rotation about its own axis within the described bearings. In order to effect such rotation, the boom section 62 mounts a sprocket 64 about which is trained an endless sprocket chain 66 which also passes around a smaller sprocket 68 on the shaft 70 of a small hydraulic motor 72 mounted on the under surface of the described rectangular frame 58. When this hydraulic motor 72 is energized, its sprocket 68, of course, rotates, which motion is transmitted through the sprocket chain 66 to the boom section 62 which, in turn, rotates on its own axis within the supporting bearings 60. Preferably, a pin 69 on the boom 62 is arranged to engage a stop 71 on the frame 50 to limit the rotation to approximately 360°.

The described boom section 62 projects both forwardly and rearwardly from the suspension bracket 50 and carries the aforementioned tree-engaging clamp 10 at its outer extremity and the mentioned shaker unit 12 at its inner extremity. More particularly, the tree-engaging clamp 10 is preferably in the form of an adjustable C-clamp, with the opening of the C directed laterally from the direction defined by the longitudinal axis of the mounting boom section 62. The C-clamp 10 includes a pair of jaws 74, 76, one of which is fixedly mounted at the extremity of the reciprocatory boom section 62. The second jaw 76 of the C-clamp is mounted in opposed facing relationship with the fixed jaw 74 at the inwardly projecting end of a rectangularly-bent mounting rod 78 having an elongated portion extending slidably into a rectangular socket 80 mounted at one side of the boom section 62 by suitable rigid brackets 82 in parallel relationship to the boom section so that as a change in the telescopic entry of the mounting rod 78 into its rectangular socket is achieved, the movable clamping jaw 76 moves closer to or further away from the fixed jaw 74. The rectangular socket arrangement precludes turning or twisting of the telescopic mounting rod 78 and thus maintains the two jaws 74, 76 in precise alignment. In order to actuate opening or closing of the jaws, a short hydraulic ram 84 is mounted within the rectangular socket member 80 for operative connection with the end of the telescopic mounting rod 78, as best illustrated in FIG. 3.

Figure 4:
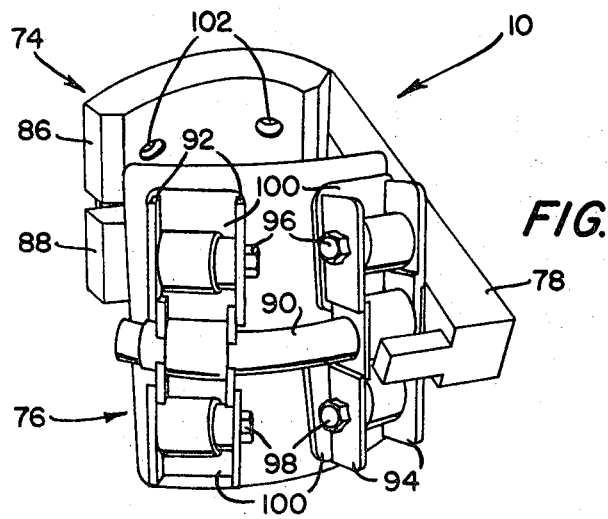
FIG. 4 is a fragmentary perspective view of a portion of the clamp structure, showing additional details thereof.

With additional reference to FIG. 4, it will be seen that each of the clamping jaws 74, 76 is arranged for limited pivotal motion on its support, thus to freely accommodate itself to a limb to be engaged. In this fashion, bark damage to a tree limb during the shaking operation is minimized. More particularly, each of the clamping jaws preferably includes a pair of rubber cushions 86, 88 at upper and lower positions, as viewed in FIG. 4, and mounted respectively above and below a curved supporting rod 90 welded or otherwise secured to the adjacent mounting frame. This curved mounting rod 90 carries pivotally a pair of vertical supports 92, 94 at its opposite extremities and each of these supports in addition to being pivotal about the curved mounting rod, itself, carries transverse pivot pins 96, 98, each of which mounts for slight pivotal movement a back-up plate 100 secured by a pivot bolt 102 to the rear surface of the adjacent portion of one of the two cushions 86, 88. Accordingly, the two cushions 86, 88 can themselves move independently and also can flex a limited amount between their opposite extremities to freely accommodate themselves to a limb that is engaged. Ultimately, tight gripping engagement can be achieved flatly with a limb regardless of its particular peculiarities of configuration and when vibratory motion is imparted to the clamp 10, effective transmission of this movement to the limb is achieved without any rubbing action so that bark damage is reduced to a nullity. The described clamp structure constitutes an improvement over that shown and described in my prior U.S. Patent No. 3,367,706 entitled "Tree Clamp" to which reference is made for additional structural details.

Figure 5:
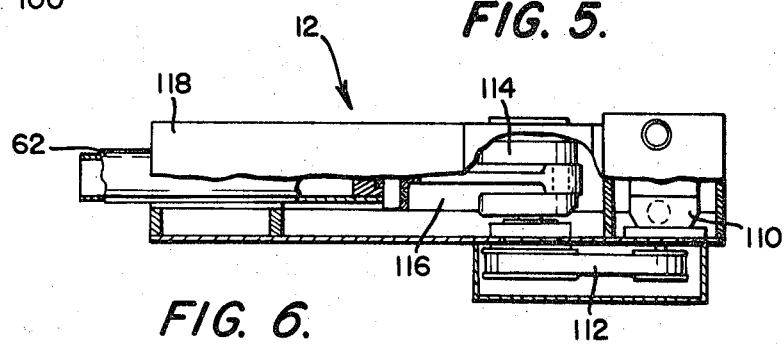
FIG. 5 is a side elevational view, partially broken away, illustrating interior details of the shaker unit.

As previously indicated, the inertia shaker unit 12 is mounted at the opposite end of the boom section 62 from the described clamp 10 and preferably takes the form, shown and described in detail in my prior U.S. Pat. No. 3,248,865, to which reference is made for details of construction and operation. Briefly, however, the inertia shaker unit 12, as shown in FIGS. 1 and 5, includes a hydraulic motor 110 that is connected by a belt and pulley arrangement 112 to actuate rotation of a suitable crank mechanism 114 and connecting rod 116 joined to the boom section 62 whose extremity is slidably supported within the shaker unit housing 118. When the hydraulic motor 110 is energized, inertial energy is imparted between it and the boom section 62 to effect relative longitudinal reciprocation between the elements. Motion of the boom section 62 is transmitted, of course, to the clamp 10 at its outer extremity wherefore vibratory shaking of the tree engaged by the clamp is achieved. On the other hand, because of the described suspension arrangement for the boom section 62, substantially no vibratory forces are transmitted to the articulated boom 14 or the Jeep 16 from which it is supported.

Figure 6:
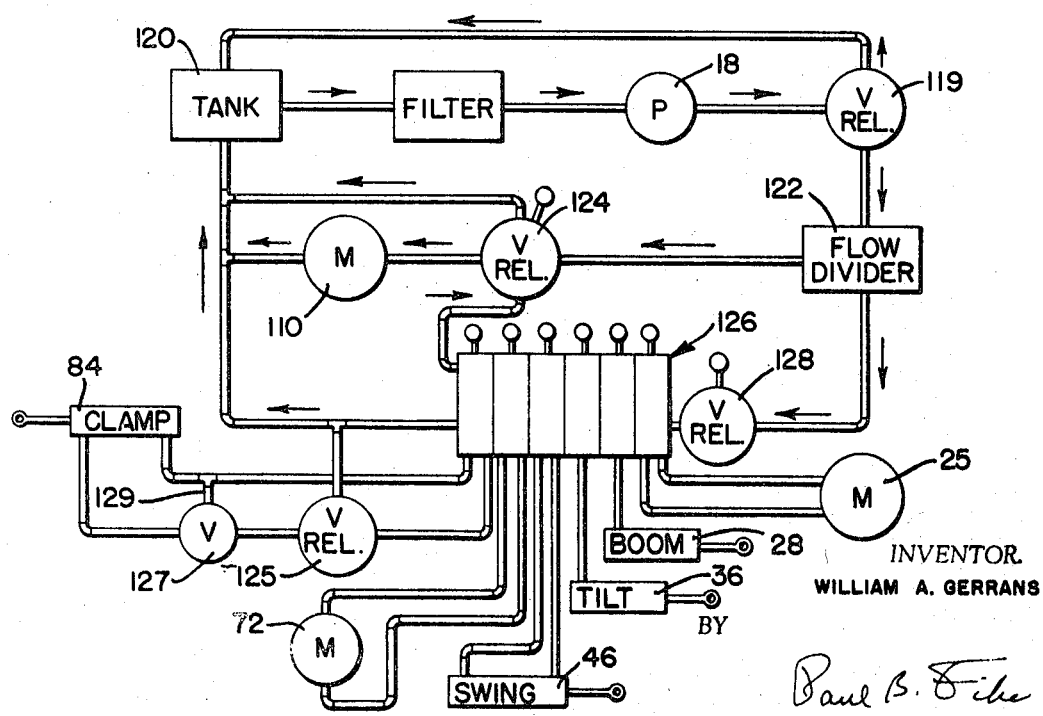
FIG. 6 is a hydraulic circuit diagram of the actuating system for the tree shaking mechanism whose physical details are disclosed in the other figures.

In order to actuate the various hydraulic components, described hereinabove, suitable flexible hydraulic lines are connected from the mentioned hydraulic pump 18 on the Jeep 16 and while all these lines are not physically illustrated in FIGS. 1 through 5, they are diagrammatically illustrated in the hydraulic circuit diagram shown in FIG. 6. With particular reference to such diagram, the pump 18 is arranged to deliver hydraulic fluid to a relief valve 119 set at approximately 2400 pounds per square inch, any pressures in excess of this opening the valve so that a direct return path, in the form of by-pass line, to a hydraulic supply tank 120 is provided. A line from the relief valve 119 passes to a flow divider 122 having two outlet lines, one of which is directly connected to a control valve 124 with a built-in 2000 pounds per square inch relief valve and the other of which passes through a control circuit and thereafter one again joins the hydraulic fluid delivered to the control valve 124. Thus, all of the fluid from the pump 18 can be delivered to the hydraulic motor 110 which requires the maximum power to effect the desired tree shaking operation. The outlet from the motor 110, of course, returns to the tank 120 and a by-pass line, of course, is provided from the control valve 124 directly to the tank 120. It is to be expressly noted that only the hydraulic shaker motor 110 is supplied with relatively high pressure hydraulic fluid and the remaining control circuit operates at relatively lower pressures, thus to render the entire hydraulic actuation most efficient and least expensive.

Reverting now to the mentioned control circuit, the divided line from the flow divider 122 passes to a stack 126 of control valves, the inlet section of which is provided with a relief valve 128 set at 1000 pounds per square inch so that if pressure in excess of this is reached in any of the separate control circuits of the stack valve, the relief valve will by-pass internally. Two of the individual valves in the stack 126 are connected to the hydraulic ram 28 for controlling the elevation of the entire articulated boom 112, and to the hydraulic ram 36 for tiltling the outer section of the boom. Both of these can be single-acting rams since gravitational force will assure return of the entire boom or the outer section thereof to a lower position when needed. In turn, additional valves in the stack 126 are provided for controlling the double-acting ram 46 for lateral swinging of the outer boom section 22, the rotary motor 72 for controlling the rotational position of the boom section 62 and the rotary motor 25 for controlling rotation of the pedestal 21. For control of the double-acting clamping ram 84, a special hydraulic circuit is connected to another stack valve and includes a second relief valve 125 adjustable between 300 and 1000 pounds per square inch and a locking valve 127 which is basically a check valve sewing to hold the clamp in its clamped position on the tree but connected by a pilot conduit 129 to the other ram conduit so as to release immediately when the clamp is to be loosened.

The operation of the mechanism will be understood from the fore-going description, but it can be briefly pointed out that the articulated boom 14 can be raised to a particular elevation adjacent a tree to be shaken and shifted laterally and the outer section 22 can then be raised or lowered or shafted laterally so as to bring the outer extremity thereof and the tree clamp 10 into contact with a particullar limb either from the side, the top or the underside thereof, the clamp 10, itself, being rotated to allow such a variety of approaches. Thus, in summary, an entire tree can usually be shaken without the necessity for multiple approaches to the tree by the jeep 16.

What is claimed is:

1. A tree shaking mechanism which comprises,
    a tree-engaging clamp operable to grip a tree to be shaken,
    an inertia-shaker unit connected to said clamp for actuating longitudinal reciprocatory motion thereof, and
    means mounting said clamp and shaker unit for longitudinal reciprocatory motion, for rotation about the longitudinal reciprocatory axis, and for pivotal motion both up and down and laterally,
    said mounting means including a reciprocatory boom section mounting said clamp and shaker unit thereon, means supporting said reciprocatory boom section for rotary adjustment about its longitudinal axis, and pivoted suspension arms suspending said reciprocatory boom section supporting means therefrom thus to permit longitudinal reciprocation of said reciprocatory boom section and said clamp and inertia shaker unit thereon.

2. A tree shaking mechanism according to claim 1 wherein,
said mounting means also includes an articulated boom carrying said pivoted suspension arms.

3. A tree shaking mechanism according to claim 2 wherein
said articulated boom includes a first boom section mounted for pivotal motion generally in an up and down direction and
a second boom section mounted for pivotal motion in a lateral direction.

4. A tree shaking mechanism according to claim 3 wherein
said second boom section is mounted for pivotal motion also in an up and down direction.

References Cited

UNITED STATES PATENTS

| | | | |
|---|---|---|---|
| 2,685,775 | 8/1954 | Gould | 56—328 |
| 2,690,639 | 10/1954 | Goodwin | 56—328 |
| 2,891,372 | 6/1959 | Goodwin | 56—328 |
| 3,121,304 | 2/1964 | Herbst | 56—328 |
| 3,132,458 | 5/1964 | Russell | 56—328 |
| 3,225,529 | 12/1965 | King | 56—328 |
| 3,335,556 | 8/1967 | Edgemond | 56—328 |
| 3,367,706 | 2/1968 | Gerrans | 56—328UX |

LOUIS G. MANCENE, Primary Examiner

J. A. OLIFF, Assistant Examiner